(12) United States Patent
Li et al.

(10) Patent No.: US 12,625,288 B2
(45) Date of Patent: May 12, 2026

(54) ULTRAFAST 3D IMAGING TECHNIQUE EMPLOYING EVENT-DRIVEN CAMERAS

(71) Applicant: Wayne State University, Detroit, MI (US)

(72) Inventors: Wen Li, Troy, MI (US); Suk Kyoung Lee, Troy, MI (US); Gabriel Stewart, Grosse Pointe Park, MI (US); Duke Debrah, Detroit, MI (US)

(73) Assignee: Wayne State University, Detroit, MI (US)

( * ) Notice: Subject to any disclaimer, the term of this patent is extended or adjusted under 35 U.S.C. 154(b) by 1125 days.

(21) Appl. No.: 17/667,148

(22) Filed: Feb. 8, 2022

(65) Prior Publication Data

US 2022/0252731 A1     Aug. 11, 2022

Related U.S. Application Data

(60) Provisional application No. 63/147,269, filed on Feb. 9, 2021.

(51) Int. Cl.
| | |
|---|---|
| G01T 5/00 | (2006.01) |
| G01S 7/4865 | (2020.01) |
| G01S 7/4915 | (2020.01) |
| G01S 17/06 | (2006.01) |
| G01S 17/894 | (2020.01) |

(52) U.S. Cl.
CPC .............. *G01T 5/00* (2013.01); *G01S 7/4865* (2013.01); *G01S 7/4915* (2013.01); *G01S 17/06* (2013.01); *G01S 17/894* (2020.01)

(58) Field of Classification Search
None
See application file for complete search history.

(56) References Cited

U.S. PATENT DOCUMENTS

2017/0329010 A1* 11/2017 Warke ..................... G01S 17/10

OTHER PUBLICATIONS

Zhao, Arthur, et al. "Coincidence velocity map imaging using Tpx3Cam, a time stamping optical camera with 1.5 ns timing resolution." Review of Scientific Instruments 88.11 (2017). (Year: 2017).*
Zhao, Arthur et al. "Coincidence velocity map imaging using Tpx3Cam, a time stamping optical camera with 1.5 ns timing resolution." The Review of Scientific Instruments, vol. 88, pp. 113104 (2017).

(Continued)

*Primary Examiner* — Luke D Ratcliffe
(74) *Attorney, Agent, or Firm* — Fishman Stewart PLLC

(57) ABSTRACT

A source emits a pulse to an object to generate a particle, and an imaging detector produces a light flash at an X/Y hit position of the particle. The detector outputs a waveform arising from the particle. An event-driven camera provides a signal from the detector that includes intensity and time-over-threshold signals related to the light flash, time-of-arrival information of the event, and the X and Y hit position of the particle. A photodiode determines a time origin of the pulse from the source. A timing circuit is coupled to the detector and to the photodiode, and determines time-of-flight (TOF) of the particle based on the waveform, and based on the time origin of the pulse. The 3D coordinates are generated based on the X/Y hit position synchronized with the TOF of the particle.

23 Claims, 9 Drawing Sheets

(56) References Cited

OTHER PUBLICATIONS

SK Lee et al., "Coincidence ion imaging with a fast frame camera,"
Rev Sci Instrum. Dec. 2014, vol. 85, iss. 12, pp. 123303.
SK Lee et al., "Communication: Time-and space-sliced velocity
map electron imaging," The Journal of Chemical Physics, (2014),
vol. 141, pp. 221101.

* cited by examiner

ULTRAFAST 3D IMAGING TECHNIQUE EMPLOYING EVENT-DRIVEN CAMERAS

CROSS-REFERENCE TO RELATED APPLICATIONS

This application claims priority to U.S. Provisional Patent Application No. 63/147,269, filed Feb. 9, 2021, the contents of which are incorporated herein in their entirety.

STATEMENT REGARDING FEDERALLY SPONSORED RESEARCH OR DEVELOPMENT

This invention was made with government support under DE-SC0012628 awarded by DEPARTMENT OF ENERGY. The government has certain rights in the invention.

FIELD OF TECHNOLOGY

Exemplary fields of technology for the present disclosure may relate to, for example, electron/ion imaging and an event-driven camera-based three-dimensional (3D) imaging system related to same.

BACKGROUND

Determination of the complete kinematic information of ions and electrons in an ionization/dissociation event typically makes use of knowledge of the full 3D momentum distribution information of the coincident fragments. Therefore, momentum imaging is one of the most powerful tools used in atomic, molecular, optical (AMO) and chemical physics. In recent years tremendous efforts and resources including a myriad of photoelectron-photoion coincidence spectrometers have been committed to understanding molecular fragmentation and ionization processes.

Two common momentum imaging spectrometers used in understanding reaction dynamics are velocity map imaging (VMI) and reaction microscopy (REMI) or cold-target recoil-ion momentum spectroscopy (COLTRIMS). Two common types of detectors employed, typically, are the 2D MCP/phosphor imaging detector and the delay-line detector for VMI and COLTRIMS, respectively. The 2D MCP/phosphor detector has outstanding multi-hit capability and high event rates but lacks the time resolution thus the 3D momentum can only be reconstructed with mathematical transformations, e. g. inverse Abel transform. On the other hand, delay-line detectors had achieved a very good time resolution but due to its longer dead time (~5 ns), has a limited multi-hit capability, especially for detecting electrons with small kinetic energy. A few variations of delay-line detectors have been developed to circumvent this issue, among which are the multi-quadrant delay line anode with independent four sets of processing electronics and a delay-line anode incorporated with a phosphor screen to provide positional information. Recently, a hybrid camera-based 3D imaging system has been developed that achieves great multi-hit capability and time-of-flight (TOF) resolution. This system uses a CMOS camera to measure the 2D positions of electron/ion hits while using a synchronized digitizer to obtain the TOF through full waveform digitization and peak detection. The achieved TOF resolution is 32 ps and a dead time less than 0.7 nanoseconds.

Even though the camera employed in the 3D imaging setup is fast (1 Kframes/s) compared to conventional charge-coupled device (CCD) cameras, with current technology it is not fast enough to operate at an event rate approaching 1

Mhits/s, with the highest event rate achieved so far as 2 Khits/s with a laser running at 10 kHz. Ultrafast cameras do exist and can achieve 1 Mframes/s. However, these cameras are prohibitively expensive, and the durations of acquisition are usually very short due to the requirement of enormous amount of data storage. Recently, a new type of camera (event-driven) has been developed for both scientific and commercial usage. Instead of capturing frames that contains a fixed number of pixels in a conventional camera, in an event-driven camera, each pixel works independently and can timestamp each over-threshold event with high timing accuracy. Because the output is a stream of over-threshold events (true events) instead of a frame that could be full of zero-value pixels, the data rate may be greatly reduced. For example, the Tpx3Cam camera was designed to achieve more than 10 Mpixels/s with a standard 1 Gbs Ethernet connection. It should be noted that even though the Tpx3Cam and other event-driven cameras have achieved a few nanoseconds timing resolution, this resolution is not enough for electron or photon TOF measurements.

Accordingly, there is a need for systems and methods that improve ultrafast 3D cameras.

BRIEF DESCRIPTION

According to the disclosure, a system includes a source configured to emit a pulse of emissions to an object, to generate a particle in the object, and an imaging detector positioned to receive the particle, and configured to produce a light flash as an event that is indicative of an X and Y hit position of the particle in the imaging detector, and configured to output a waveform arising from the particle. An event-driven camera is directed toward the imaging detector and capable of providing an imaging detector signal that includes, when the event occurs: intensity and time-over-threshold (TOT) signals related to the light flash, time-of-arrival (TOA) information of the event, and the X and Y hit position of the particle based on a location of the light flash. A photodiode is positioned to detect signals indicative of a time origin of the pulse from the source. A timing circuit is coupled to the imaging detector and coupled to the photo-diode, and configured to determine a time-of-flight (TOF) of the particle based on the waveform from the imaging detector, and based on the time origin of the pulse from the photodiode. A hardware processor and a memory having a program communicatively connected to the hardware processor, the hardware processor being communicatively connected to the timing circuit and to the event-driven camera, the hardware processor providing operations including generating 3D coordinates (position and time) for the particle based on the X and Y hit position of the particle synchronized with the TOF of the particle.

According to the disclosure, a method includes configuring a source to emit a pulse of emissions to an object, generating a particle in the object and positioning an imaging detector to receive the particle, the imaging detector configured to produce a light flash as an event that is indicative of an X and Y hit position of the particle in the imaging detector, and to output a waveform arising from the particle. The method includes directing an event-driven camera toward the imaging detector and capable of providing an imaging detector signal that includes, when the event occurs: intensity and time-over-threshold (TOT) signals related to the light flash, time-of-arrival (TOA) information of the event, and the X and Y hit position of the particle based on a location of the light flash. The method further includes positioning a photodiode to detect signals indicative of a time origin of the pulse from the source, coupling a timing circuit to the imaging detector and to the photo-diode, and configuring the timing circuit to determine a time-of-flight (TOF) of the particle based on the waveform from the imaging detector, and based on the time origin of the pulse from the photodiode, and communicatively con-necting a hardware processor and a memory having a program to the hardware processor, and communicatively connecting the hardware processor to the timing circuit and to the event-driven camera, and providing the hardware processor operations including generating 3D coordinates (position and time) for the particle based on the X and Y hit position of the particle synchronized with the TOF of the particle.

According to the disclosure, a method includes generating 3D coordinates for a particle based on an X and Y hit position of the particle synchronized with a time-of-flight (TOF) of the particle, the particle generated from a pulse of emissions directed an object, determining the X and Y hit position from an event-driven camera, and determining the TOF of the particle based on 1) a waveform from an imaging detector that receives the particle, and 2) based on a time origin of the particle, wherein the time origin of the particle is determined in a photodiode that receives the pulse of laser emissions.

DETAILED DESCRIPTION

Figure 1:
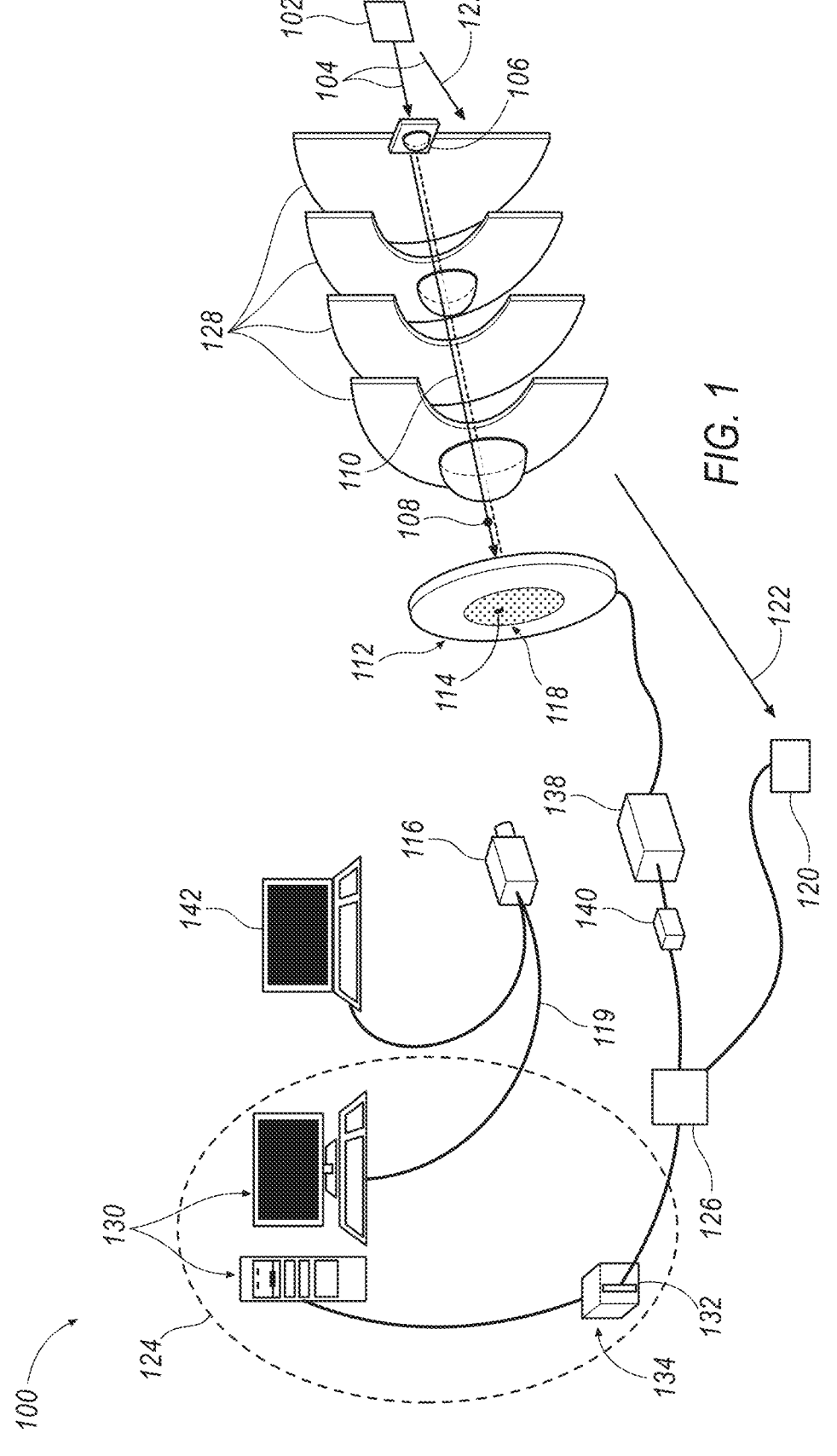
FIG. 1 illustrates a schematic of the disclosed setup.

According to the disclosure, an event-driven camera is demonstrated as a drop-in replacement for a conventional CMOS camera. In one example, the camera-based 3D imaging system achieves an event rate approaching 1 mil-lion electron hits per second (Mhits/s), while maintaining its outstanding TOF resolution and very low deadtime for electron detection.

Disclosed Setup and Methods

According to the disclosure, an experimental setup is disclosed in FIG. 1 and as further set forth below. Two of the major components include an event-driven Tpx3Cam and a high-speed digitizer. Main components of Tpx3Cam is a Timepix3 chip bump-bonded to a specialized silicon optical sensor (256×256 pixels) and the SPIDR readout system. A distinct feature of this camera is its capability of providing information on both the Time-over-Threshold (TOT) and Time-of-Arrival (TOA) on every hit detected by an MCP/phosphor imaging detector. In this arrangement, the TOAs were used to timestamp electron events for synchronization purpose while the TOTs gave an estimate of the pixel brightness. To stream waveform data in real-time at 1 Mhits/s, a high-speed digitizer was used. In one example, an AlazarTech high-speed digitizer (ATS9373) was used to acquire MCP waveforms arising from each electron hit. The ATS9373 is a 12-bit PCIe3 digitizer capable of a sampling rate of 4 GigaSamples/s while sustaining a transfer rate of 6.8 GigaBytes/s to a host computer. Together with the trigger re-arm time (~200 ns), these features enable a card, or the overall system, to capture more than 1 Mwaveforms/s with a time resolution of 250 ps.

To demonstrate the disclosed arrangement, the system measured photo-induced thermionic emission from gra-phene using a high repetition rate laser system, similar with previously reported work. The employed laser was a mode-locked Ti: Sapphire oscillator system (a repetition rate of 80 MHz). The center wavelength was 790 nm and the pulse duration was ~35 fs. The laser input power was a few tens of mW. Commercially available chemical vapor deposition (CVD) graphene on fused silica surface (graphenesquare.com) was used without further modifica-tion or treatment. The sample was placed in a high vacuum chamber (~10-9 torr) at room temperature and was directly mounted onto the first electrode of the spectrometer. The laser power was varied to yield different event rates (100 Khit/s, 200 Khits/s and 500 Khits/s) as read by the digitizer. The electrons emerging from graphene was accelerated and momentum-focused toward the MCP/P47 phosphor detef-dropctor (Photonis APD, 75 mm diameter) by a four-electrode VMI spectrometer. Upon electron impacts, light flashes were produced on the phosphor screen indicating the hit-positions. The positions were then captured by the Tpx3Cam camera and the TOF was obtained by digitizing electrical signals associated with voltage drop in MCP produced by electron hits. The camera was operated in free-run mode, but the high-speed digitizer was triggered by MCP signals. The signal from MCP was first combined with the laser signal picked-off from a photodiode (FIG. 1) and was then digitized. At the observed event rates, the count rate per laser shot was still far below one, which enabled coincident measurement of the position and the TOF of each event. For multi-hit events, the correlation between peak height of digitizer events and the brightness of camera events (TOT) can be exploited to associate the TOF and the position for each event produced by the same laser pulse.

Because the digitizer and the camera cannot be triggered by the laser pulses directly due to the extremely high laser repetition rate, the positional information read from the camera and the TOF from digitizer will have to be synchro-nized to provide 3D information (2D position plus TOF) for each event. This was achieved offline by matching the global timestamps of the digitizer events with the TOAs of Tpx3Cam events, both of which were available from the metadata associated with each event. Note the TOA is not the TOF of the electron hits but a global timestamp registering the time when a camera event is taking place. The TOA has enough depth to run for several hours during the data acquisition providing the global timestamps with granularity of 1.6 ns while the digitizer timestamps can be as accurate as 1 ns.

Figure 2:
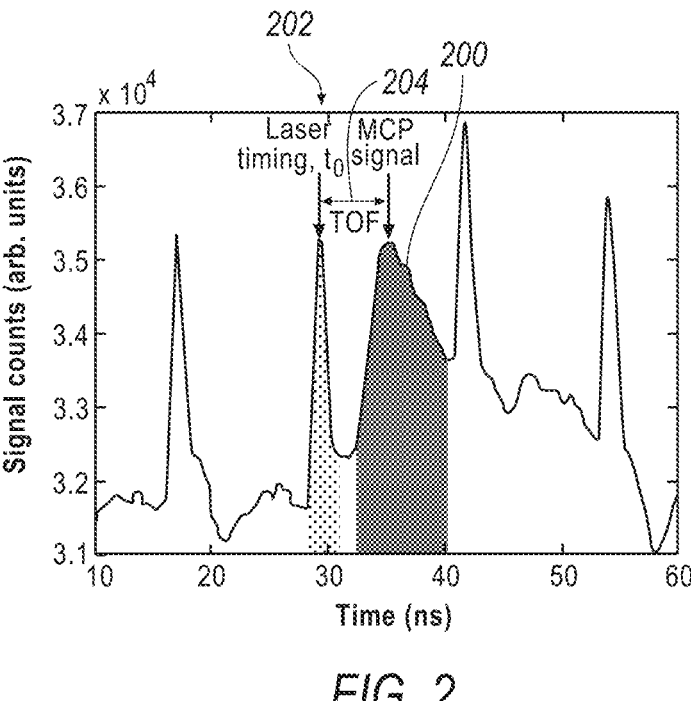
FIG. 2 illustrates a typical time-of-flight (TOF) trace measured from the digitizer.

The electron TOF was obtained using a peak detection algorithm on recorded digitizer traces, one of which is shown in FIG. 2. The relative time difference between the peaks of the sharp feature (signal from photodiode) and those of the broad feature (MCP signal) was used as the TOF. The closest peak is selected directly before the MCP signal as the laser timing. Because the cable length and light path difference, the absolute TOF will have a constant offset from this value, which requires a calibration step to obtain. Here, because the main purpose is to show the instrumentation, this calibration was not performed. The instrument TOF resolution was estimated by measuring the relative delay between two laser pulses and the standard deviation was about 20 ps, which was similar to previously reported 18 ps. This was much better than the time resolution of the digitizer thanks to oversampling of signals. This also suggests our current TOF measurement scheme should be able to achieve a similar electron TOF resolution at 32 ps.

According to the disclosure and referring again to FIGS. 1 and 2, a system 100 includes a source 102 configured to emit a pulse of emissions 104 to an object 106, to generate a particle 108 in the object 106 that follows a path 110 from object 106. A micro-channel plate (MCP)/phosphor imaging detector 112 is positioned to receive particle 108, and configured to produce a light flash 114 as an event that is indicative of an X and Y hit position 118 of particle 108 in MCP/phosphor imaging detector 112. MCP/phosphor imaging detector 112 is configured to output a waveform 200 arising from particle 108. An event-driven camera 116 is directed toward MCP/phosphor imaging detector 112 and capable of providing an MCP signal 119/200 that includes, when the event occurs:

1) intensity and time-over-threshold (TOT) signals related to light flash 114;
  2) a coarse time-of-arrival (TOA) information of the event; and
  3) the X and Y hit position 118 of the particle based on a location of the light flash.

A photodiode 120 is positioned to detect signals from emissions 104 that include emission of a pulse 122 that passes unimpeded from source 102 to photodiode, the signals indicative of a time origin 202 of pulse 122 from source 102 (i.e., pulse 122 does not pass through any materials, such as electrodes 128). A timing circuit 124 is coupled to MCP/phosphor imaging detector 104 and coupled to photodiode 120 via a signal decoupler 126, and configured to determine a time-of-flight (TOF) 204 of particle 108 based on waveform 200 from MCP/phosphor imaging detector 112, and based on time origin 202 of pulse 122 determined from photodiode 120. A hardware processor 130 includes a memory having a program communicatively connected to hardware processor 130, hardware processor 130 being communicatively connected to timing circuit 124 and to event-driven camera 116, the hardware processor providing operations that include generating 3D coordinates (position and time) for particle 108 based on X and Y hit position 118 of particle 108 synchronized with TOF 204 of particle 108.

Hardware processing operations further include generating the 3D coordinates by synchronizing 1) a first global time stamp that corresponds with the detected signals from photodiode 120 with 2) a second global time stamp that corresponds with TOA 202 from event-driven camera 116. Timing circuit 124 includes, in one example, a digitizer 132 coupled to hardware processor 130. Digitizer 132 is configured to digitize the signals from photodiode 120, and to digitize the TOT signals from event-driven camera 116. Hardware processor 130 determines TOF 204 based on the digitized signals from photodiode 132 and based on the digitized TOT signals.

In another example, timing circuit 124 includes instead of photodiode 132, a time-to-digital converter (TDC) 134 coupled to the hardware processor, and TDC 134 determines a number of counts that correspond with TOF 204 based on time origin 202 of pulse 104, 122 determined from photodiode 120 and based on a time of a peak of counts of MCP signal 119/200.

In one example, source 1102 is a laser. In one example, the particle is one of an ion, an electron, and a photon, generated in object 106. In one example, timing circuit 124 is triggered by MCP signal 119/200. In one example, system 100 further includes one or more electrodes 128 having openings 136 through which particle 108 is accelerated from object 106 to MCP/phosphor imaging detector 112. System 100 may include a signal decoupler 138 and an amplifier 140.

Figure 3:
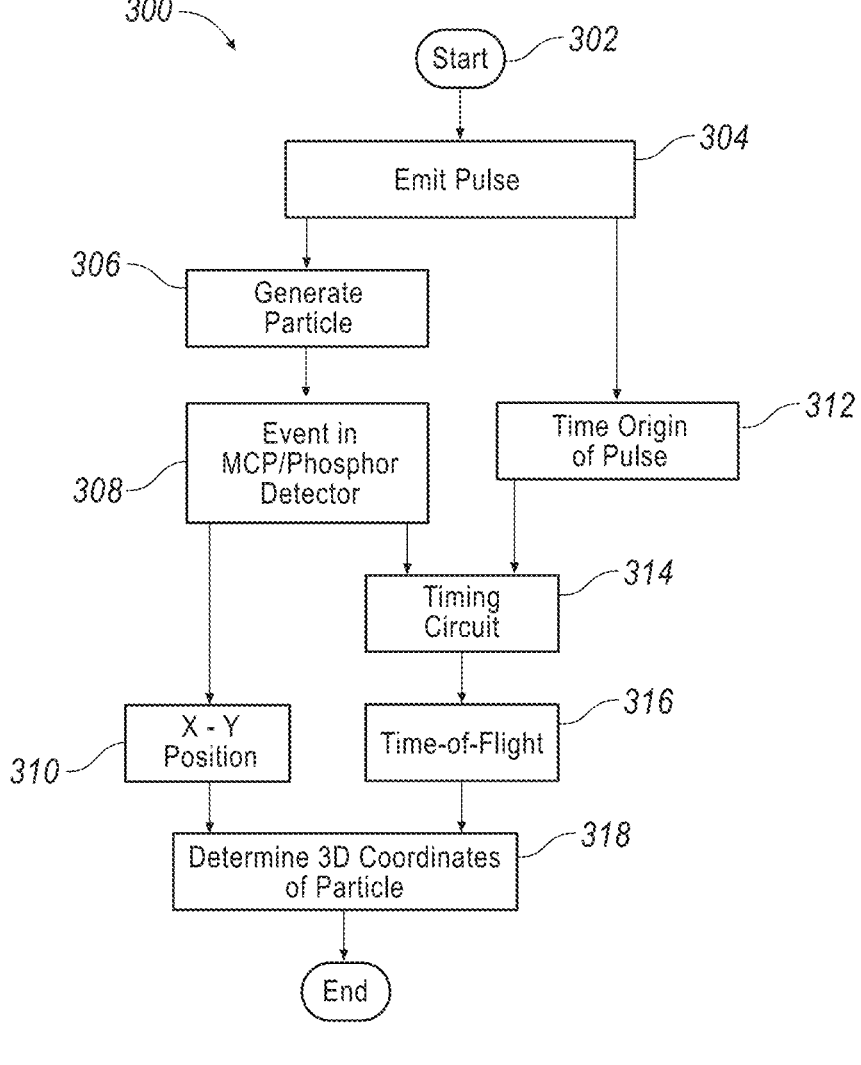
FIG. 3 illustrates a flowchart of steps for determining 3D coordinates according to the disclosure.

According to the disclosure, referring to FIG. 3 and FIG. 1, a method 300 starts at 302 and a pulse of emissions is emitted 304 from laser 102 to object 106. Particle 108 is generated 306 and at 308 a light flash 114 occurs as an event in MCP/phosphor imaging detector 112, providing at 310 X and Y hit position 118 via event-driven camera 116. Pulse 122 provides time origin 202 at 312. At 314 timing circuit 124 is coupled to photodiode 120 and to MCP/phosphor imaging detector 112 to determine TOF 204 at 316. At 318 3D coordinates, including X/Y position and time-of-flight, are determined for particle 108. As disclosed, the described process and system correspond to operation for one particle, and as indicated herein and in FIGS. 5 and 6, 3D coordinates are determined for many particles according to the disclosure.

Figure 4:
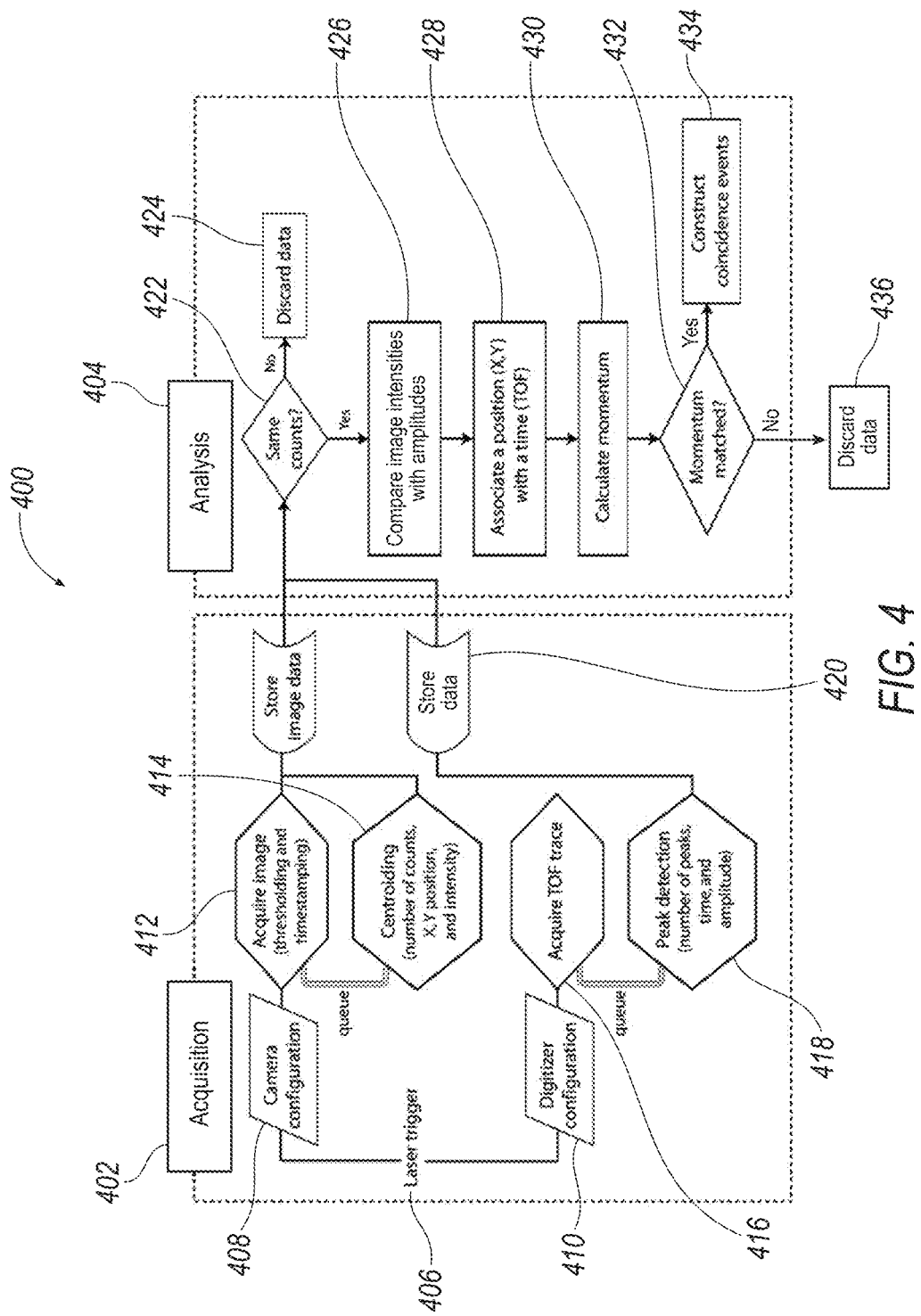
FIG. 4 is a graphical layout of acquisition and analysis steps according to the disclosure.

FIG. 4 illustrates, consistent with the above method and system, an illustration 400 of both acquisition 402 and analysis 404. A laser trigger 406 applies to both the disclosed camera configuration 408 and the disclosed digital configuration 410. For camera configuration 408, image date is acquired 412 (to include thresholding and timestamping) via event-driven camera 116, and counts, X/Y position, and intensity for the events are obtained 414. Image data is stored 416. TOF 204 is acquired 416 via digitizer configuration 410, which as discussed includes timing circuit 124 and based on MCP signal 119/200 and pulse 202 from photodiode 120. Such data for TOF traces including peak detection (number of peaks, time, amplitude). Corresponding data is stored 420. Analysis 404 occurs either in hardware processor 130 or in a second offline computer 142 (FIG. 1). Data is reconciled 422 based on timing of events through the camera configuration and the digitizer configuration—and discarded if not 424. If so, image intensities and amplitudes are compared and at 428 the X/Y position and corresponding time-of-flight are associated. Momentum is calculated 430 and, if matched 432, coincidence events are constructed 434. If not matched, the data is discarded 436.

Results and Discussion

Figures 5A, 5B, 5C, 6A, 6B, 6C, 6D:
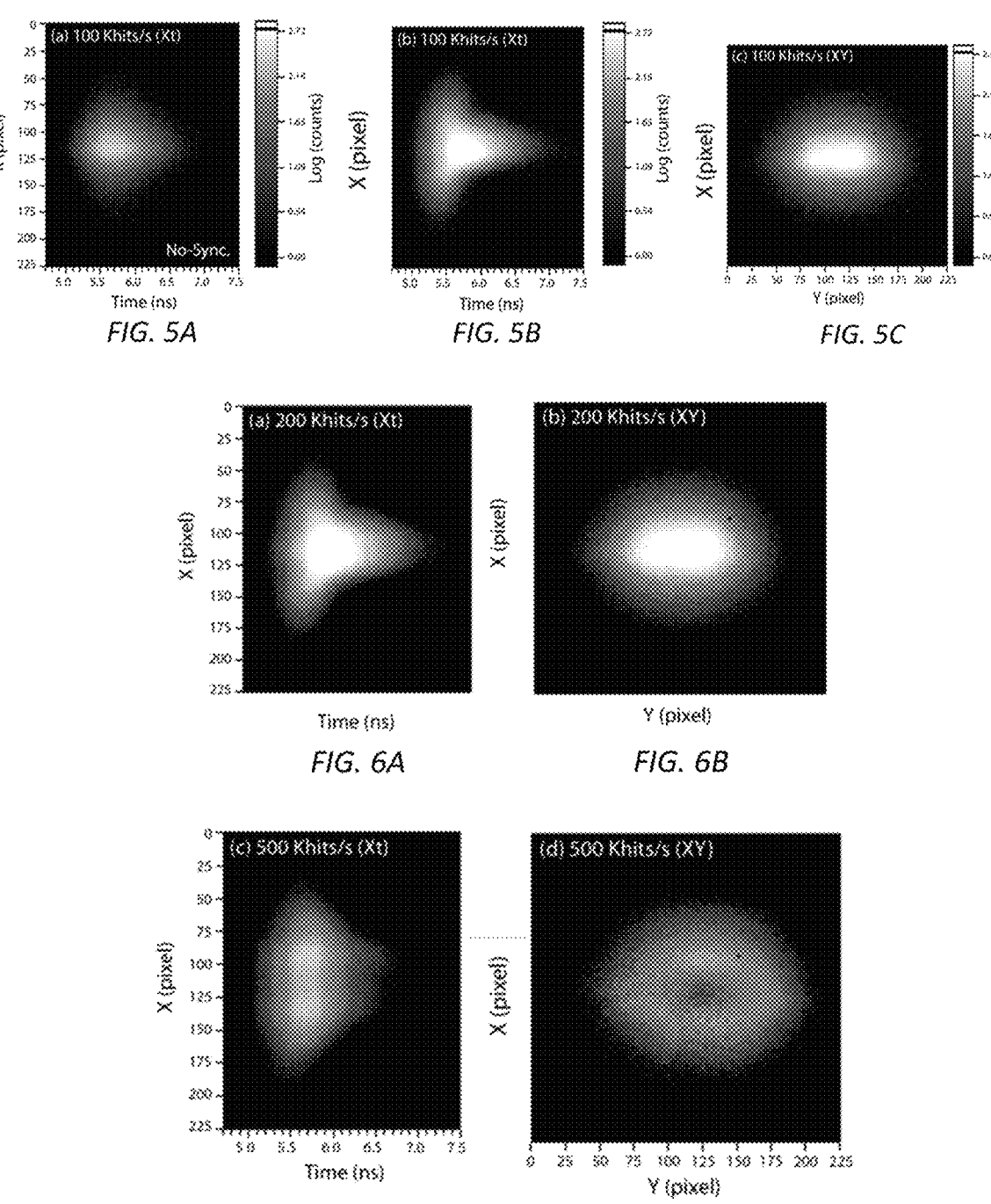
FIG. 5A illustrates an Xt image (t is the TOF) for randomly assigned positions (camera) and TOF (digitizer) without matching event timestamps.
FIG. 5B illustrates a synchronized Xt image after time-stamp matching.
FIG. 5C illustrates an XY spatial image obtained from the camera.
FIG. 6A illustrates a 3D raw image of photoemission of graphene at 200 Khits/s with the colormap scale the same as in FIGS. 5A-C.
FIG. 6B illustrates a 3D raw image of photoemission of graphene at 200 Khits/s with the colormap scale the same as in FIGS. 5A-C.
FIG. 6C illustrates a 3D raw image of photoemission of graphene at 500 Khits/s with the colormap scale the same as in FIGS. 5A-C.
FIG. 6D illustrates a 3D raw image of photoemission of graphene at 500 Khits/s with the colormap scale the same as in FIGS. 5A-C.

The 3D measurement results are shown in FIGS. 5A-5C. FIG. 5C shows the 2D (X, Y) image as seen by the camera whereas the FIGS. 5A and 5B show unsynchronized and synchronized (X, t) images, respectively. The properly synchronized time-space image of the 3D electron Newton sphere (FIG. 5B) confirms previously observed delayed electron emission from graphene. The delayed emission has a tail extending beyond 1 ns after the laser irradiation. This was proposed as a signature of long-lived charge carriers in graphene. Such a feature was missing in unsynchronized image (FIG. 5A). This suggests the developed scheme for synchronizing the Tpx3Cam camera events and the digitizer events worked nicely and achieved a significantly higher event rate at 100 Khits/s. The data acquisition time was 30 seconds owing to the high event rate while previously taking an hour to accumulate similar counts. To show it was possible to go even higher event rates, the power of the laser is increased to reach 200 Khits/s and 500 Khits/s. The data at 200 Khit/s shows very similar structures (FIGS. 6A, 6B). However, the data at 500 Khits/s shows a truncated tail in Xt image (FIG. 6C) and a hole appears in the center of the XY image (FIG. 6D). These features were not due to real dynamics that arose from increasing the laser power. Instead, they were due to the deadtime of MCP. Because of the very high event rate and the small area that electrons hit on the detector, there was a significant chance that the same microchannel was hit consecutively within one millisecond. This hampers the full re-charging of the channel and thus reduces the gain. This was confirmed by much smaller clusters on the camera representing single hits at high event rates. This issue is common to MCP based imaging system. One solution is to expand the electron cloud using a smaller acceleration field for electrons. Because the energy of the photoelectrons from graphene is small, especially those arising from delayed emission, such a measure was not effective in the current setup. For this reason, it was not attempted to increase the event rate further. A new setup with a longer time-of-flight length will help solve this. However, it must be emphasized that this issue is not an inherent shortfall of the 3D imaging system presented here. The Tpx3Cam used here is capable of processing 12 Mpix/s (and up to 80 Mpix/s with 10 Gbs optical readout) while the digitizer can acquire >5M waveforms/s. Therefore, there are no technical issues to prevent the developed imaging system from achieving 1 Mhits/s when a proper source/spectrometer is employed.

To summarize, the disclosed camera-based 3D imaging system is demonstrated by using the Tpx3Cam with great multi-hit capability and time resolution, and is capable of achieving 1 Mhits/s. It is noted that commercial event-driven cameras with timing accuracy of one microsecond would allow to achieve similar 1 Mhits/s performance at a potentially lower cost.

Figure 7:
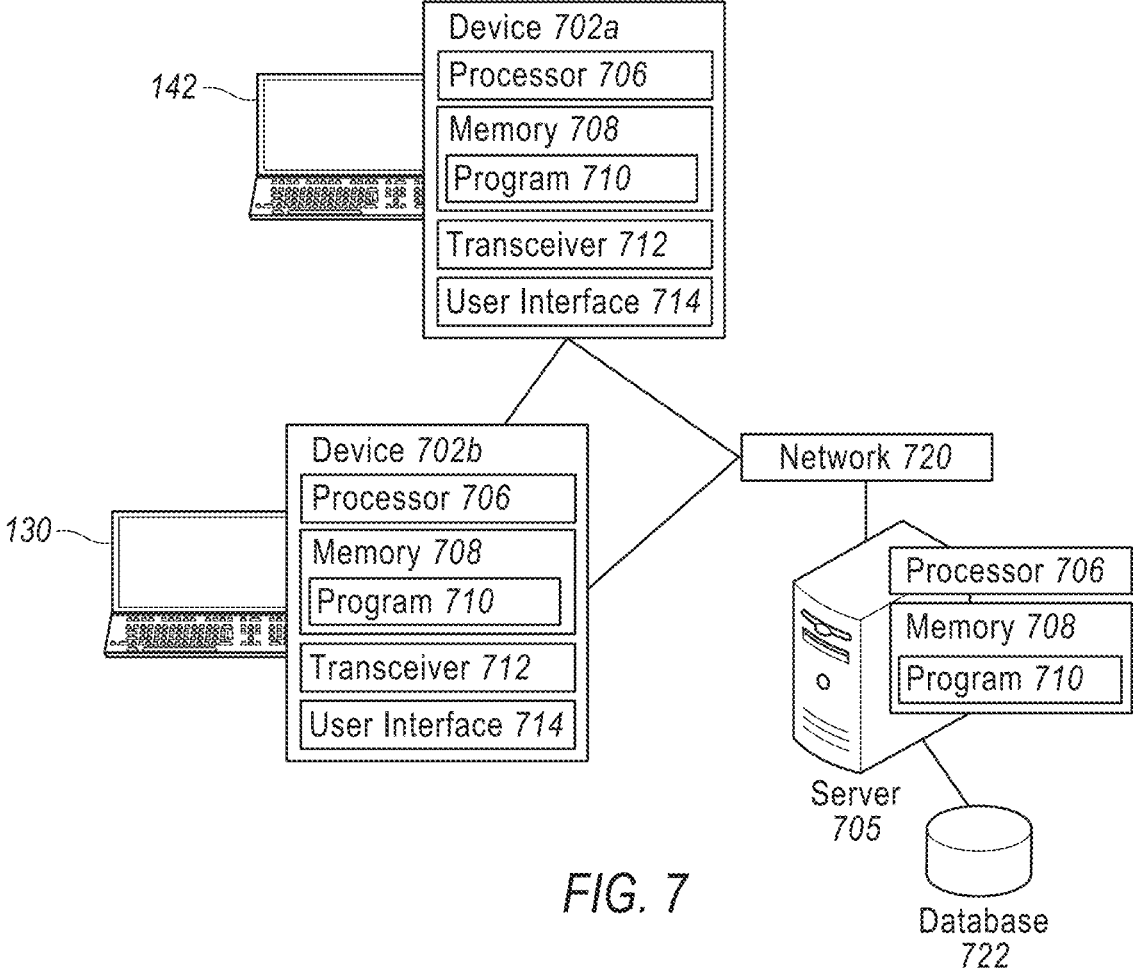
FIG. 7 illustrates an exemplary system that corresponds generally to computers 1 and 2 shown in FIG. 1.

FIG. 7 illustrates exemplary computers 130 and 142 shown in FIG. 1 which may be coupled together via a network 720. General interactions between various disclosed system elements are shown, and may include computers 130 and 142 having combined operation in system 100, or separately as two systems shown as computer 130 and computer 142. System 100 incorporates exemplary arrangements that operate as computers 130 and 142 as disclosed herein. While an exemplary system 100 is shown in FIG. 1, the exemplary components illustrated in FIG. 1 are not intended to be limiting, may be optional, and are not essential to any other component or portion of system 100.

Computers 130 and 142 may include one or more of devices 702*a*, 702*b*, server 705, processor 706, memory 708, program 710, Transceiver 112, user interface 714, network 720, and database 722. Device 702 may include any or all of devices 702*a*, 702*b* (e.g., a desktop, laptop, or tablet computer). Processor 706 may include a hardware processor that executes program 710 to provide any or all of the operations described herein Connections may be any wired or wireless connections between two or more endpoints (e.g., devices or systems), for example, to facilitate transfer of information. The connection may include a local area network, for example, to communicatively connect the devices 702*a* and 702*b* with network 720. The connection may include a wide area network connection, for example, to communicatively connect server 705 with network 720. The connection may include a wireless connection, e.g., radiofrequency (RF), near field communication (NFC), Bluetooth communication, Wi-Fi, or a wired connection, for example, to communicatively connect the devices 702*a* and 702*b*.

Any portion of the system may include a computing system and/or device that includes a processor 106 and a memory 108. Computing systems and/or devices generally include computer-executable instructions, where the instructions may define operations and may be executable by one or more devices such as those listed herein. Computer-executable instructions may be compiled or interpreted from computer programs created using a variety of programming languages and/or technologies, including, without limitation, and either alone or in combination, Java language, C, C++, Visual Basic, Java Script, Perl, SQL, PL/SQL, Shell Scripts, Unity language, etc. The system may take many different forms and include multiple and/or alternate components and facilities, as illustrated in the Figures. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, the computing systems and/or devices may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OS X and iOS operating systems distributed by Apple Inc. of Cupertino, California, the BlackBerry OS distributed by Research In Motion of Waterloo, Canada, and the Android operating system developed by the Open Handset Alliance. Examples of computing systems and/or devices may include, without limitation, mobile devices, cellular phones, smart-phones, super-phones, next generation portable devices, mobile printers, handheld or desktop computers, notebooks, laptops, tablets, wearables, virtual or augmented reality devices, secure voice communication equipment, networking hardware, computer workstations, or any other computing system and/or device.

Further, processors such as processor 706 receive instructions from memories such as memory 708 or database 722 and execute the instructions to provide the operations herein, thereby performing one or more processes, including one or more of the processes described herein. Such instructions and other information may be stored and transmitted using a variety of computer-readable mediums (e.g., memory 708 or database 722). Processors such as processor 106 may include any computer hardware or combination of computer hardware that is configured to accomplish the purpose of the devices, systems, operations, and processes described herein. For example, the processor 106 may be any one of, but not limited to single, dual, triple, or quad core processors (on one single chip), graphics processing units, and visual processing hardware.

A memory such as memory 708 or database 722 may include, in general, any computer-readable medium (also referred to as a processor-readable medium) that may include any non-transitory (e.g., tangible) medium that provides instructions that may be read by a computer. Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Further, databases, data repositories or other information stores (e.g., memory 708 and database 722) described herein may generally include various kinds of mechanisms for storing, providing, accessing, and retrieving various kinds of information, including a hierarchical database, a set of files in a file system, an application database in a proprietary format, a relational database management system (RDBMS), etc. Each such information may generally be included within to a computing system and/or device employing a computer operating system such as one of those mentioned above, and/or accessed via a network or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

Figure 8:
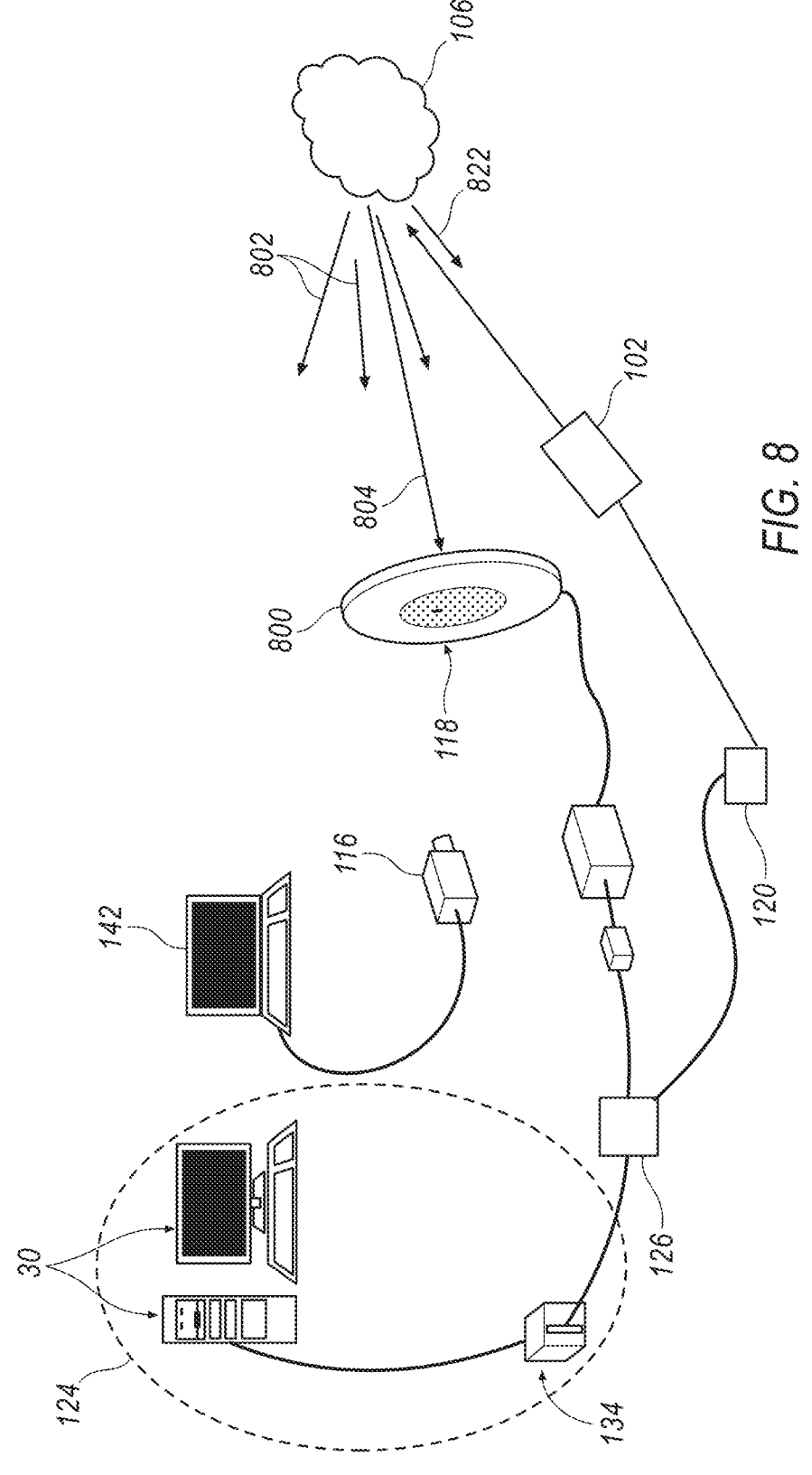
FIG. 8 is a schematic of the disclosed setup in a LIDAR/3D scanner.

FIG. 8 is a schematic of the disclosed setup in a LIDAR/3D scanner. By replacing the MCP/phosphor screen imaging device in the described system above with a single-photon imaging device such as an image intensifier 800, the system and the method can be used to capture the 3D information of photons 802 in a similar fashion, with photon emissions 802, 822 corresponding such that 804 is an emission of a photon instead of that of electrons corresponding to emissions 104 above. In combination with a pulsed laser 102, the system will provide highly accurate 3D positions of objects (location and distance) at 1 million pixel per seconds. This is a superior implementation of Light Detection and Ranging (LIDAR) and 3D scanner.

Figure 9:
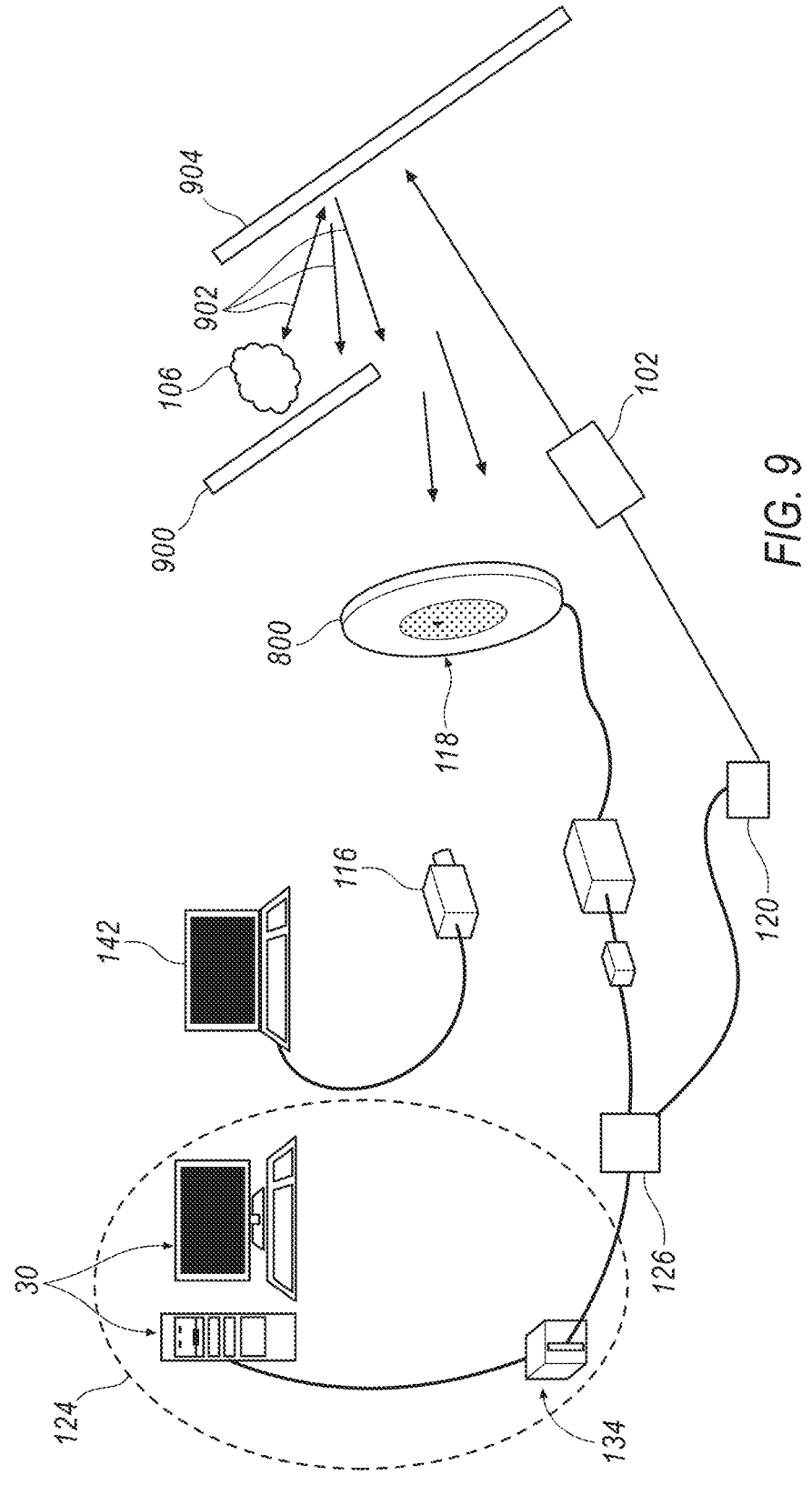
FIG. 9 is a schematic of the disclosed setup in a non-line-of-site imaging arrangement.

FIG. 9 is a schematic of the disclosed setup in a non-line-of-sight imaging arrangement. Using the system described above and with a reconstruction algorithm, objects beyond line-of-sight can be detected and imaged. In this arrangement object 106 is positioned behind an obstacle 900 and photons 902 are scattered to object 106 from an obstruction 904. Scatter photons are generated from the object to image intensifier 800 and 3D positions are similarly obtained.

Figure 10:
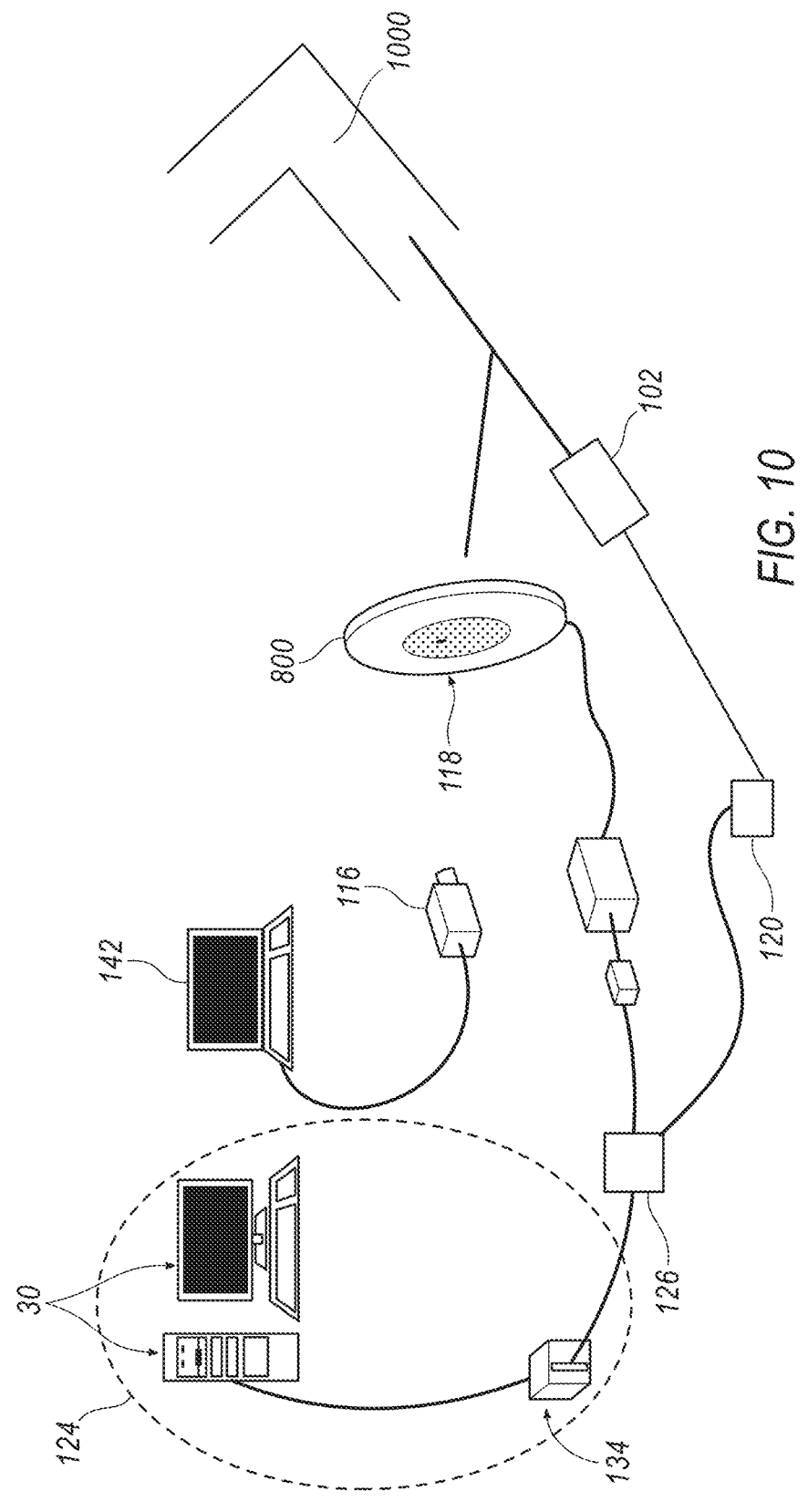
FIG. 10 is a schematic of the disclosed setup in a medical imaging arrangement combining LIDAR and non-line-of-site imaging.

FIG. 10 is a schematic of the disclosed setup in a medical imaging arrangement combining LIDAR and non-line-ofsite imaging. Applying the system described above and as a 3D endoscope, 3D images of internal cavities 1000 either in line-of-sight, or beyond line-of-sight can be constructed for purpose of medical diagnosis.

Thus, according to the disclosure, a system includes a source configured to emit a pulse of emissions to an object, to generate a particle in the object, and an imaging detector positioned to receive the particle, and configured to produce a light flash as an event that is indicative of an X and Y hit position of the particle in the imaging detector, and configured to output a waveform arising from the particle. An event-driven camera is directed toward the imaging detector and capable of providing an imaging detector signal that includes, when the event occurs: intensity and time-over-threshold (TOT) signals related to the light flash, time-of-arrival (TOA) information of the event, and the X and Y hit position of the particle based on a location of the light flash. A photodiode is positioned to detect signals indicative of a time origin of the pulse from the source. A timing circuit is coupled to the imaging detector and coupled to the photodiode, and configured to determine a time-of-flight (TOF) of the particle based on the waveform from the imaging detector, and based on the time origin of the pulse from the photodiode. A hardware processor and a memory having a program communicatively connected to the hardware processor, the hardware processor being communicatively connected to the timing circuit and to the event-driven camera, the hardware processor providing operations including generating 3D coordinates (position and time) for the particle based on the X and Y hit position of the particle synchronized with the TOF of the particle.

According to the disclosure, a method includes configuring a source to emit a pulse of emissions to an object, generating a particle in the object and positioning an imaging detector to receive the particle, the imaging detector configured to produce a light flash as an event that is indicative of an X and Y hit position of the particle in the imaging detector, and to output a waveform arising from the particle. The method includes directing an event-driven camera toward the imaging detector and capable of providing an imaging detector signal that includes, when the event occurs: intensity and time-over-threshold (TOT) signals related to the light flash, time-of-arrival (TOA) information of the event, and the X and Y hit position of the particle based on a location of the light flash. The method further includes positioning a photodiode to detect signals indicative of a time origin of the pulse from the source, coupling a timing circuit to the imaging detector and to the photodiode, and configuring the timing circuit to determine a time-of-flight (TOF) of the particle based on the waveform from the imaging detector, and based on the time origin of the pulse from the photodiode, and communicatively connecting a hardware processor and a memory having a program to the hardware processor, and communicatively connecting the hardware processor to the timing circuit and to the event-driven camera, and providing the hardware processor operations including generating 3D coordinates (position and time) for the particle based on the X and Y hit position of the particle synchronized with the TOF of the particle.

According to the disclosure, a method includes generating 3D coordinates for a particle based on an X and Y hit position of the particle synchronized with a time-of-flight (TOF) of the particle, the particle generated from a pulse of emissions directed an object, determining the X and Y hit position from an event-driven camera, and determining the TOF of the particle based on 1) a waveform from an imaging detector that receives the particle, and 2) based on a time origin of the particle, wherein the time origin of the particle is determined in a photodiode that receives the pulse of laser emissions.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain examples, and should in no way be construed so as to limit the claims.

Accordingly, it is to be understood that the above description is intended to be illustrative and not restrictive. Many examples and applications other than those provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future examples. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system, comprising:
an imaging detector positioned to receive a particle generated by a pulse of emissions from a source to produce a light flash as an event that is indicative of an X and Y hit position of the particle in the imaging detector, and the imaging detector configured to output a waveform arising from the particle;
an event-driven camera directed toward the imaging detector and capable of providing an imaging detector signal based on the event, wherein the imaging detector signal includes:

1) Intensity and time-over-threshold (TOT) signals related to the light flash;
2) Time-of-arrival (TOA) information of the event; and
3) The X and Y hit position of the particle based on a location of the light flash;
a photodiode positioned to detect unimpeded emission signals from unimpeded emissions from the source, wherein the unimpeded emission signals are indicative of a time origin of the pulse from the source, and wherein the emissions include the unimpeded emissions, and wherein the unimpeded emissions did not pass through materials;
a timing circuit coupled to the imaging detector to receive the waveform and coupled to the photodiode to receive the unimpeded emission signals, the timing circuit configured to determine a time-of-flight (TOF) of the particle based on the waveform from the imaging detector and the time origin of the pulse from the photodiode; and
a hardware processor and a memory having a program communicatively connected to the hardware processor, the hardware processor being communicatively connected to the timing circuit and to the event-driven camera, the hardware processor provides operations including:
generation of 3D coordinates of the particle, wherein the 3D coordinates include the X and Y hit position of the particle synchronized with the TOF of the particle.

2. The system of claim 1, wherein the imaging detector is one of a micro-channel plate (MCP)/phosphor imaging detector and an image intensifier.

3. The system according to claim 1, wherein the synchronization the determined TOF of the particle with the X and Y hit position of the particle includes synchronization of 1) a first global time stamp that corresponds with the detected unimpeded signal from the photodiode with 2) a second global time stamp that corresponds with the TOA from the event-driven camera.

4. The system according to claim 1, wherein the timing circuit includes a digitizer coupled to the hardware processor, the digitizer configured to digitize the unimpeded emission signals from the photodiode, and to digitize the TOT signals from the event-driven camera, and the hardware processor determines the TOF based on the digitized unimpeded emission signals from the photodiode and based on the digitized TOT signals.

5. The system according to claim 1, wherein the TOF is based on a time difference between the time origin of the pulse from the photodiode and a time of a peak of counts based on the waveform from the imaging detector signal.

6. The system of claim 1, wherein the source is a laser.

7. The system of claim 1, wherein the particle is one of an ion, an electron, and a photon.

8. The system of claim 1, wherein the timing circuit is triggered by the imaging detector signal.

9. The system of claim 1, further comprising one or more electrodes having openings through which the particle is accelerated from an object to the imaging detector.

10. A method, comprising:
emitting a pulse of emissions to an object to generate a particle;
positioning an imaging detector to receive the particle, the imaging detector configured to produce a light flash as an event that is indicative of an X and Y hit position of the particle in the imaging detector, and to output a waveform arising from the particle;

directing an event-driven camera toward the imaging detector and capable of providing an imaging detector signal that includes, when the event occurs:

1) Intensity and time-over-threshold (TOT) signals related to the light flash;

2) Time-of-arrival (TOA) information of the event; and

3) The X and Y hit position of the particle based on a location of the light flash;

positioning a photodiode to detect unimpeded emission signals from unimpeded emissions from a source, wherein the unimpeded emission signals are indicative of a time origin of the pulse from the source, and wherein the pulse of emissions include the unimpeded emissions, and wherein the unimpeded emissions did not pass through materials;

coupling a timing circuit to the imaging detector and to the photodiode, the timing circuit configured to determine a time-of-flight (TOF) of the particle based on the waveform from the imaging detector and the time origin of the pulse from the photodiode; and communicatively connecting a hardware processor and a memory having a program to the hardware processor, and communicatively connecting the hardware processor to the timing circuit and to the event-driven camera, and providing the hardware processor operations including:

generating 3D coordinates of the particle; wherein the 3D coordinates include the X and Y hit position of the particle synchronized with the TOF of the particle.

11. The method according to claim 10, wherein the imaging detector is one of a micro-channel plate (MCP)/ phosphor imaging detector and an image intensifier.

12. The method according to claim 10, wherein synchronization of the determined TOF of the particle with the X and Y hit position of the particle comprises synchronization of 1) a first global time stamp that corresponds with the detected unimpeded signal from the photodiode with 2) a second global time stamp that corresponds with the TOA from the event-driven camera.

13. The method according to claim 10, wherein coupling the timing circuit includes coupling a digitizer to the hardware processor, and configuring the digitizer to digitize the unimpeded emission signals from the photodiode and the waveform from the imaging detector.

14. The method according to claim 10, wherein the TOF is based on a time difference between the time origin of the pulse from the photodiode and a time of a peak of counts based on the waveform from the imaging detector signal.

15. The method of claim 10, wherein the source includes a laser to emit the pulse.

16. The method of claim 10, wherein the particle includes one of an ion, an electron, and a photon.

17. The method of claim 10, further comprising triggering the timing circuit by the imaging detector signal.

18. The method of claim 10, further comprising positioning one or more electrodes having openings through which the particle is accelerated from the object to the imaging detector.

19. A method, comprising:

determining, via an event-driven camera, an X and Y hit position of a particle received on an imaging detector, the particle generated by emissions from a pulse;

determining a time of flight (TOF) of the particle based on 1) a waveform from the imaging detector, and 2) based on a time origin of the particle, wherein the time origin of the particle is based on a photodiode signal from a photodiode that receives unimpeded emissions of the pulse that generated the particle, and wherein the unimpeded emission is a pulse do not pass through materials; and generating 3D coordinates for the particle based on the X and Y hit position of the particle synchronized with the TOF of the particle.

20. The method of claim 19, wherein the imaging detector is one of a micro-channel plate (MCP)/phosphor imaging detector and an image intensifier.

21. The method of claim 19, wherein the emissions are generated via a laser.

22. The method of claim 19, wherein the particle generated is one of an ion, an electron, and a photon.

23. The method of claim 19, wherein the TOF is based on a time difference between the time origin of the pulse from the photodiode and a time of a peak of counts based on the waveform from the imaging detector signal.

\* \* \* \* \*